United States Patent

Gerber et al.

[11] Patent Number: 5,520,801
[45] Date of Patent: May 28, 1996

[54] LIQUID FILTER

[75] Inventors: Manfred Gerber, Tamm; Heinz Wendt, Ludwigsburg, both of Germany

[73] Assignee: Filterwerk Mann & Hummel GmbH, Ludwigsburg, Germany

[21] Appl. No.: 272,541

[22] Filed: Jul. 11, 1994

[30] Foreign Application Priority Data

Jul. 9, 1993 [DE] Germany ............ 43 22 894.1

[51] Int. Cl.$^6$ ............................................. B01D 35/02
[52] U.S. Cl. ............................. 210/130; 210/184; 210/248; 210/342; 210/438; 210/450; 210/456; 210/458
[58] Field of Search ........................... 210/184, 248, 210/315, 342, 437, 440, 441, 457, 458, 130, 316, 323.2, 418, 434, 450, 487, 490, 497.01, 438, 456

[56] References Cited

U.S. PATENT DOCUMENTS

| | | | |
|---|---|---|---|
| 2,432,475 | 12/1947 | Griffith | 210/184 |
| 2,750,042 | 6/1956 | Wilkinson | 210/440 |
| 3,056,503 | 10/1962 | Roosa | 210/234 |
| 3,283,902 | 11/1966 | Farris et al. | 210/315 |
| 3,487,929 | 1/1970 | Sample et al. | 210/90 |
| 4,094,791 | 6/1978 | Conrad | 210/316 |
| 4,906,365 | 3/1990 | Baumann et al. | 210/248 |

FOREIGN PATENT DOCUMENTS

| | | |
|---|---|---|
| 405447 | 1/1991 | European Pat. Off. . |
| 825537 | 12/1951 | Germany . |
| 3103723 | 9/1982 | Germany . |
| 3933794 | 4/1991 | Germany . |
| 4017500 | 12/1991 | Germany . |
| 197710 | 10/1977 | U.S.S.R. ............... 210/315 |

*Primary Examiner*—Matthew O. Savage
*Attorney, Agent, or Firm*—Evenson, McKeown, Edwards & Lenahan

[57] ABSTRACT

A liquid filter includes an openable filter housing. The liquid filter has an unfiltered-liquid inlet and a clean-liquid outlet. A first filter element is arranged in the filter housing. The first filter element has an essentially hollow-cylindrical design, with the liquid flow travelling through it from the outside to the inside. An additional hollow-cylindrical filter element is arranged inside of the first filter element, wherein the liquid flow is also from the outside to the inside through the additional filter element. A separating wall is disposed between the two filter elements. The entire filter has a compact construction with a large effective filter area.

6 Claims, 1 Drawing Sheet

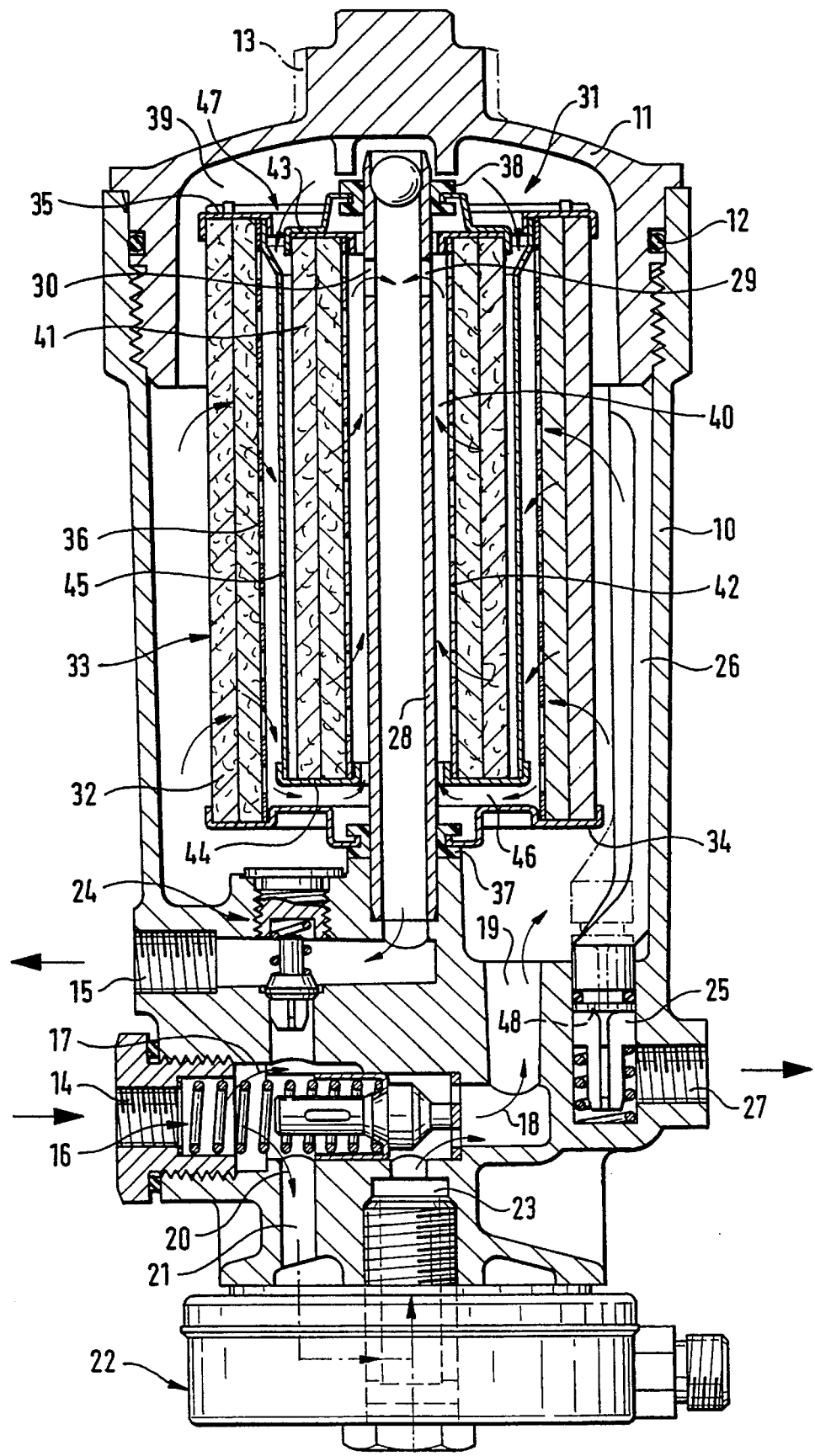

LIQUID FILTER

BACKGROUND OF THE INVENTION

This invention relates to a liquid filter and, more particularly, to a liquid filter including an openable filter housing, an unfiltered-liquid inlet, a clean-liquid outlet, and first and second filter elements. The first filter element is arranged in the filter housing and is designed essentially in the shape of a hollow cylinder. The liquid flow travels through the first filter element from its exterior to its interior.

Hicks, German Patent No. DE 825,537, discloses a filter which is suitable for filtering liquids. This known filter has essentially two filter elements. The liquid to be cleaned flows into a concentric space formed between the two filter elements. The liquid then flows from the concentric space through the two filter elements. This leaves the liquid in both the core area of the filter and at an outer circumferential area of the filter. The known filter is designed as an edge filter, in which case two different edge shapes may be selected.

It is a disadvantage of the known filter that the cleaned liquid emerges from the filter element on both the inside as well as on the outside of the element, thus making it difficult to guide the two liquid flows together. Naturally, it is also possible to reverse the flow direction. In this case, the cleaned liquid will flow out between the two filter elements. However, problems are then presented in the feeding of the unfiltered liquid.

SUMMARY OF THE INVENTION

There is therefore needed a liquid filter which is suitable for ensuring an optimal supply and discharge of both the unfiltered and clean liquids.

These needs are met by a liquid filter including an openable filter housing having a peripheral wall, a base, an open end opposite the base, an unfiltered-liquid inlet, a clean-liquid outlet, a first filter element arranged in the filter housing and designed essentially in the shape of a hollow cylinder wherein the liquid flow travels through the filter element from its exterior to its interior, and another hollow-cylindrical shaped filter element. The additional hollow-cylindrical shaped filter element is arranged inside the first filter element such that the liquid flow through the additional filter element also travels from its exterior to its interior. A separating wall is arranged between the two filter elements.

A significant advantage of the present invention is the creation of a liquid filter wherein any dirt is always deposited on the exterior side of each filter element and wherein the cleaned liquid can be jointly supplied in a simple manner to a clean-liquid outlet. The clean liquid outlet is situated in the interior of the two filter elements.

An advantageous further embodiment of the invention provides a bypass duct for the second filter element. The bypass duct is implemented, for example, by the fact that the second filter element has a reduced length. This, therefore, forms an annular gap or duct at its lower and upper front edges.

Clean liquid is guided through a center tube. At the same time, the center tube functions as a supporting tube for the filter element. In an area between the faces of the filter element and the center tube, a sealing effect occurs between the unfiltered-liquid side and the clean-liquid side.

According to a further embodiment of the present invention, the two filter elements form a unit and are provided with axial end plates. Each end plate is provided with a radial seal on its center bore. In a mounted condition, the radial seals rest against the center tube.

According to another advantageous embodiment of the invention, the filter elements, which include a filter medium, end plates, as well as a separating tube, may be detachably connected with one another. As a result, it is possible to recycle the individual elements or material components.

For increasing the operational reliability and for ensuring a supply of liquid even when the filter insert is very dirty, i.e., an insert through which liquid no longer flows because of the large amount of dirt, a filter bypass valve is arranged in a further embodiment of the invention between the clean-liquid side and the unfiltered-liquid side. This filter bypass valve will open up at a defined differential pressure and will establish a direct connection between the entrance and the exit of the filter.

Particularly when the liquid filter is used as a fuel filter, it is important to equip the filter with a venting system. In an advantageous embodiment of the invention, the unfiltered-liquid space or the clean-liquid space is provided with a venting bore. Through this venting bore, fuel continuously flows back into a storage tank. The returning amount of fuel is very small and is therefore not important during the operation. However, the venting bore is suitable for refilling the filter with fuel within a short time, for example, after an exchange of the filter element or after a complete evacuation of the fuel system.

A further embodiment of the invention provides a base outlet valve arrangement for the filter. This is expedient in order to ensure during a servicing, i.e., an exchange of the filter element, that the liquid contained in the housing can flow-off. The filter includes a drain outlet in the base for draining the filter housing, an outlet valve in the base operable to open or close the drain outlet, a removable lid for closing the open end of the filter housing, and an axially slidable member separate from the filter elements and slidably disposed between the peripheral wall of the housing and the exterior of the first filter element, the member having a first end abutting the lid and a second end engaging the valve such that axial movement of the member will operate the valve. Removal of the lid from the housing permits the slidable member to move to a first position in which the valve is operated to open the drain outlet, whereas installing the lid to the housing moves the slidable member to a second position in which the valve is operated to close the drain outlet.

According to a further embodiment of the invention, a heating element is arranged on the filter. The heating arrangement is particularly advantageous when it is required that the filtered fuel not fall below a certain temperature.

Other objects, advantages and novel features of the present invention will become apparent from the following detailed description of the invention when considered in conjunction with the accompanying drawings.

BRIEF DESCRIPTION OF THE DRAWING

The sole FIGURE is a cross-sectional view of a filter according to the invention.

DETAILED DESCRIPTION OF THE PREFERRED EMBODIMENT

The sole FIGURE illustrates a fuel filter including a filter housing 10 which is open on its top side and can be closed by a lid 11. Expediently, the lid 11 is screwed onto the filter housing 10. An O-ring seal 12 is provided between the lid 11 and the filter housing 10. In order for the lid to be openable by a tool, such as a wrench, the lid 11 is provided with a centrally arranged hexagon-shaped 13 head 13.

In the lower portion of the filter housing 10, an unfiltered-liquid inlet 14, as well as a clean-liquid outlet 15, are disposed. The unfiltered-liquid inlet 14 is provided with a thermostatic valve 16. As a function of the temperature of the unfiltered liquid, the thermostatic valve 16 controls the passage of the unfiltered liquid through the filter. When the temperature of the unfiltered liquid is above a predetermined limit value, the unfiltered liquid is fed directly via the bore 19 to the filter as shown by the arrows 17, 18. When the temperature of the unfiltered liquid is below a certain limit value, it is fed to a heating element 22 via a bore 21 as shown by the arrow 20. The heating element 22 may, for example, be a heat exchanger or an electric heating element. Here, the unfiltered liquid is heated and, via bore 23, reaches bore 19, and then the filter.

In addition, a filter bypass valve 24 is provided. The filter bypass valve 24 is connected between the unfiltered-liquid inlet 14 and the clean-liquid outlet 15. If for any reason the flow of the liquid through the filter exceeds a permissible differential pressure, this valve 24 will open up and short-circuit the unfiltered-liquid inlet 14 and the clean-liquid outlet 15.

Furthermore, a base outlet valve 25 is provided. The base outlet valve 25 ensures a discharge of the liquid situated in the filter during an exchange of the filter element. An exchange of the filter element is accomplished by opening up the lid 11. In the operating condition of the filter, the base outlet valve 25 is closed. As soon as the lid 11 is unscrewed and therefore lifted, the axial movement of the lid 11 causes a lifting of a slide 26. This slide 26 affects the base outlet valve 25 such that the valve 25 opens up as a result of the axial movement. The opening of the valve 25 exposes an outlet 27 through which the liquid situated in the filter can flow-off into a storage tank or into a fuel tank (not shown). A center tube 28, which is partially provided with openings 29, 30, is rigidly connected with the filter housing 10.

The exchangeable filter pack 31 includes a first filter element 32 which has a double-layer felt element 33 as the filter medium. The felt element 33 is fastened between two end plates 34, 35 and is supported on a supporting jacket 36. The end plates have radial seals 37, 38 arranged in their center. These radial seals 37, 38 ensure a reliable sealing on the center tube 28 and therefore a sealing between the outer unfiltered-liquid area 39 and the inner clean-liquid area 40.

A second filter element 41 is also provided. The second filter element 41 is constructed corresponding to filter element 33, likewise having a supporting jacket 42 as well as axial end covers 43, 44. Between the first and second filter elements, a separating wall 45 is provided. The liquid, which is cleaned by the first filter element 32, flows downward between the supporting jacket 36 and the separating wall 45 through an annular gap or bypass duct 46 into the center of the filter pack. Together with the liquid cleaned by the filter element 41, the liquid arrives via the bores 30, 29 in the center tube 28. From there, the liquid passes to the clean-liquid outlet 15. The inflow of the unfiltered liquid to the second filter element 41 takes place via openings 47 which are arranged in the end plate 35. This FIGURE illustrates the liquid flow traveling through the two filter elements from the outside to the inside of the filter.

The FIGURE also illustrates the optimum utilization of the available space for a filter area that is as large as possible. This ensures that the filter has a high efficiency.

As described above, the lid 11 is unscrewed in order exchange the filter pack 31. The filter pack 31 may be pulled out and separated into its component parts wherein either only the felt element is replaced or the entire filter pack is completely replaced.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A liquid filter for filtering a liquid flow, comprising:

a filter housing having a peripheral wall, a base, and an open end opposite said base;

an unfiltered-liquid inlet and a clean-liquid outlet communicating with an interior of said filter housing;

a first filter element, having a hollow cylindrical shape, arranged in said interior of said filter housing, said liquid flow travelling from an exterior to an interior of said first filter element;

a second filter element, having a hollow cylindrical shape, arranged inside of said first filter element, said liquid flow travelling from an exterior to an interior of said second filter element;

a separating wall arranged between said first and second filter elements;

a center tube arranged in said filter housing, said center tube collecting clean liquid supplied from said first and second filter elements;

a drain outlet in said base for draining said filter housing;

an outlet valve in said base operable to open or close said drain outlet;

a removable lid for closing the open end of the filter housing;

an axially slidable member separate from said filter elements and slidably disposed between the peripheral wall of the housing and the exterior of said first filter element, said member having a first end abutting said lid and a second end engaging said valve such that axial movement of said member will operate said valve, whereby removal of said lid from said housing permits said slidable member to move to a first position in which said valve is operated to open said drain outlet, and whereby installing said lid to said housing moves said slidable member to a second position in which the valve is operated to close said drain outlet.

2. A liquid filter according to claim 1, further comprising:

a bypass duct around said second filter element, said liquid flow which is cleaned by said first filter element flowing through said bypass duct.

3. A liquid filter according to claim 1, wherein each of said first and second filter elements comprise a filter medium and end plates, said end plates and said separating wall being detachably connected to said filter medium.

4. A liquid filter according to claim 1, further comprising a filter bypass valve provided between said unfiltered-liquid inlet and said clean-liquid outlet.

5. A liquid filter according to claim 1, further comprising a venting opening provided for at least one of an unfiltered-liquid space and a clean-liquid space.

6. A liquid filter according to claim 1, further comprising a heating element provided for heating said liquid flow through said filter.

* * * * *